Patented Nov. 10, 1953

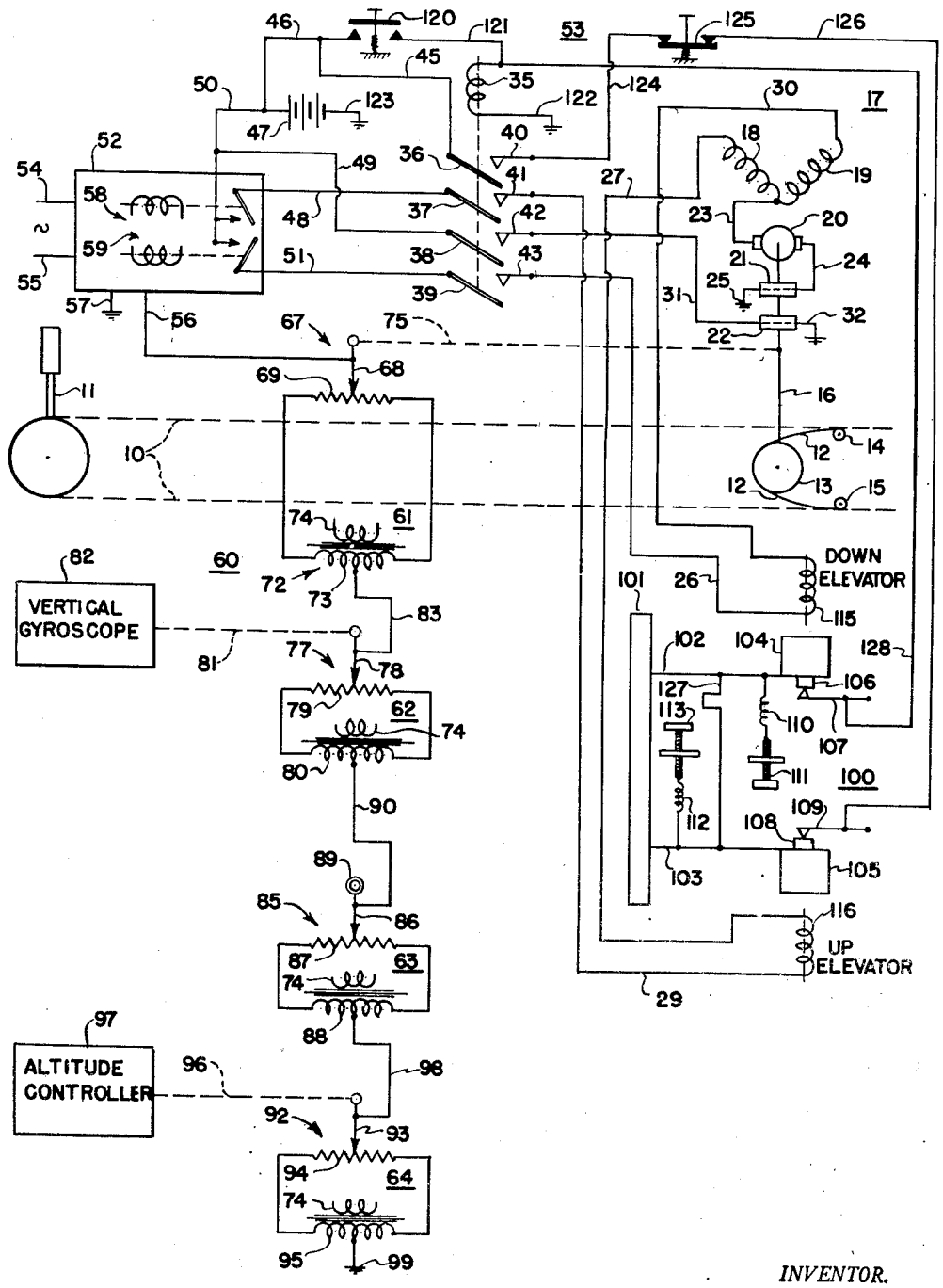

2,659,041

UNITED STATES PATENT OFFICE 2,659,041

AUTOMATIC STEERING MECHANISMS

Robert J. Kutzler, St. Louis Park, Minn., assignor to Minneapolis-Honeywell Regulator Company, Minneapolis, Minn., a corporation of Delaware Application August 25, 1952, Serial No. 306,189

12 Claims. (Cl. 318—489)

This invention pertains to automatic steering mechanisms for dirigible craft such as aircraft. Such steering mechanisms may include a type of servomotor that may be operatively clutched with or engaged with a control surface. Such control surface may also be directly manually positioned. During this direct manual positioning of the control surface, the servomotor is operatively disengaged or declutched from the control surface.

The disengagement of the servomotor from its control surface may be selectively manually effected as a preliminary step to the assumption of direct manual control of the surface. However, there are occasions when automatic disengagement of a servomotor from its control surface is desirable. As an illustration, consider the pitch channel of an automatic steering mechanism wherein the elevator surface is operated by the elevator servomotor. The disengagement of this elevator servomotor from its surface may be desirable in one situation where due to an up or down draft the linear acceleration of the aircraft is such that the permissible stress on the craft structure is being approached and it is desirable to avoid overstressing the craft. If the servomotor be automatically disengaged from its control surface before the craft structure is overstressed, the elevator control surface may be directly manually operated to reduce the acceleration.

While automatic disengagement of the servomotor and its control surface at an acceleration slightly less than that acceleration which would cause overstressing the craft is normally an acceptable arrangement where the acceleration is due alone to an external disturbance on the craft such as the aforementioned up or down draft, which did not involve as an incident to the application of the stress the operation of the elevator control surface, it is desirable to reduce the magnitude of the acceleration at which disengagement occurs during actual operation of the surface by the automatic steering mechanism. This is particularly true where the direction of operation of the control surface is such that it tends to increase the acceleration of the craft above that occasioned by the external disturbance.

Other situations may arise where it is desirable to lower the magnitude of the acceleration at which disengagement occurs. One situation is contemplated where the servomotor is used in a balanceable or follow-up system that controls the extent of servomotor operation and wherein the elevator control surface displacement in the follow-up system is proportional to a change in craft pitch attitude as detected by a sensing device in the balanceable system. If the servomotor continued to displace the elevator surface, due to a malfunction of the balanceable system preventing its rebalance, the angle of attack of the aircraft would be increasing. Increase in angle of attack, within limits, causes an increase in lift. An increase in lift in turn increases upward or linear acceleration of the craft. As acceleration increases, disengagement of the servomotor and surface to prevent overstress may result.

However, the aircraft has an angular momentum about its pitch axis due to the continuously operated elevator surface; and even when disengagement of the servomotor and surface occurs, the angular momentum of the aircraft about its pitch axis due to the displaced elevator surface will cause an increase in the angle of attack beyond that at disengagement. It is this increase in the angle of attack that results in a higher linear acceleration beyond that at which disengagement normally occurs which might cause overstressing of the craft structure.

It is therefore an object of this invention to provide a novel arrangement in an aircraft for operatively disengaging a control surface of the craft from its servomotor.

It is a further object of this invention to provide a novel arrangement in an aircraft for operatively disengaging a control surface of the craft from its operating servomotor when the linear acceleration of the craft in a direction normal to its pitch and roll axes attains a predetermined value.

It is a further object of this invention to provide a novel arrangement in an aircraft for operatively disengaging a control surface of the craft from its operating servomotor when the craft attains a predetermined magnitude of linear acceleration and to automatically reduce the magnitude of the acceleration at which such disengagement occurs in one direction when the control surface is operated by an automatic steering mechanism of the craft.

It is a further object of this invention to provide an aircraft with an automatic steering mechanism for positioning the elevator control surface of the craft through a servomotor operatively engaged with the surface and wherein disengagement of the surface from its servomotor occurs when the craft attains a linear acceleration in either direction along a line normal to the roll and pitch axes of the aircraft and wherein the value of acceleration in one direction in which automatic disengagement occurs is decreased upon the positioning of the elevator surface from the servomotor.

It is a further object of this invention to provide a steering mechanism for an aircraft wherein a servomotor is operatively engaged with a control surface of the craft and wherein the servomotor is operatively disengaged from the surface automatically when the craft attains a predetermined value of linear acceleration and wherein further the magnitude of the acceleration which causes the disengagement of the servomotor and control surface is decreased when the servomotor operates the control surface in a direction tending to increase the acceleration of the craft above that occasioned by an external disturbance acting on the craft.

The above and further objects of the invention will become apparent hereinafter upon consideration of the following description of a preferred embodiment of the invention taken in conjunction with the annexed drawing illustrating the same.

The drawing is a schematic representation of a servomotor is of the reversible D. C. type and control surface of a conventional aircraft through a clutching arrangement responsive to a novel craft acceleration monitoring device.

Referring to the drawing, the elevator control surface (not shown) of the aircraft is operated by main control cables 10 extending from a conventional manual controller 11. The elevator surface may also be operated by power operated cables 12 extending from a cable drum 13 which cables pass over guide pulleys 14, 15, and are suitably connected to the main cables 10 whereby motion of the drum 13 is communicated to the main cables. The cable drum 13 is carried on an output shaft 16 of an elevator servomotor 17. The servomotor is of the reversible D. C. type and comprises field windings 18, 19, armature 20, combination pulsing clutch brake 21, and magnetic clutch 22 for operatively engaging the servomotor 17 with the cable drum 13. The servomotor 17 is connected through an operated elevator engage relay 53 to an amplifier 52 which reversibly controls the rotation of the servomotor 17 and is also connected through the relay to a source of voltage such as a battery 47 for operatively connecting or clutching the servomotor 17 with the elevator control surface. The amplifier 52 is of the A. C. discriminator type and its operation is controlled by a balanceable control signal network 60. The continued operation of the elevator engage relay 18 and thus the continued operative engagement of the servomotor 17 with the cable drum 13 and thus with the elevator control surface is controlled by an accelerometer device 100 which in response to vertical acceleration of the aircraft in either upward or downward direction above a predetermined magnitude interrupts a circuit of winding which effects the operation of relay 18 and thus disengages the servomotor 17 from its control surface.

An understanding of the details of the invention may be obtained from the following complete description. The servomotor field windings 18 and 19 are connected together to have one common junction. Extending from this common junction and connected in series in the following order are conductor 23, motor armature 20, conductor 24, pulsing clutch brake 21, conductor 25, which is connected to ground. The relay 53 is of the four pole single throw single make type comprising an operating winding 35, relay arms 36, 37, 38, and 39 which engage respectively with in contacts 40, 41, 42, and 43. The free end of motor winding 18 is connected by conductor 27, accelerometer control winding 116, to be described, conductor 29 to relay in contact 41. The free end of motor winding 19 is connected to conductor 30, accelerometer control winding 115, conductor 26 to relay in contact 43. The input side of magnetic clutch 22 is connected by conductor 31 to in contact 42 of relay 18 and the output side of the clutch is connected through conductor 32 to ground. The remaining in contact 40 of the relay 18 constitutes part of a holding circuit to be described for maintaining the relay energized. Relay arm 36 is connected by conductors 45, 46, to a source of D. C. voltage such as battery 47. Relay arm 37 is connected by conductor 48 to the output side of elevator amplifier 52. Relay arm 38 is connected by conductor 49, 50, to battery 47. Relay arm 39 is connected by conductor 51 to the output side of elevator amplifier 52.

The amplifier 52 which is of the A. C. discriminator type has A. C. power input connections 54, 55 extending to the ship's supply and alternating voltage signal input connections 56, 57 connected to the balanceable network 60. The amplifier includes a pair of alternatively energized single make relays 58, 59. One or the other of the relays in the amplifier is energized depending upon the phase relationship of the voltage across signal input connections 56, 57 relative to the voltage across the power input connections 54, 55. The amplifier 52 may be of the type disclosed in Patent 2,425,734 to Willis H. Gille et al. Such amplifier is so constructed as to have an on time and an off time for the amplifier relays. For large values of input control voltage the amplifiers are continuously closed but for smaller values of control signal voltage the relays are intermittently operated thereby to decrease the on time. As the control signals become smaller, the on time decreases until when there is no control signal supplied the relays remain unenergized.

Control voltage signals are obtained from the balanceable network 60 comprising series connected voltage generators 61, 62, 63, and 64. Signal generator 61 comprises a rebalancing potentiometer 67 having a slider 68 and a resistor 69 which is connected across a secondary winding 73 of a transformer 72 having a primary winding 74. Slider 68 is positioned along resistor 69 through a suitable follow-up operating connection 75 extending from the output shaft 16 of servomotor 17. Amplifier conductor 56 extends to slider 68. Signal generator 62 comprises a pitch attitude potentiometer 77 having a slider 78 and a resistor 79 which is connected across a secondary winding 80 of the transformer. Through a suitable operating connection 81, a vertical gyroscope 82 positions slider 78 relative to resistor 79 in accordance with the pitch attitude of the aircraft. A conductor 83 connects a center tap of secondary winding 73 with slider 78. As indicated in signal generators 61 and 62, a single primary winding 74 of a transformer 72 is utilized to supply a plurality of secondary windings. Signal generator 63 comprises a manually operable trim potentiometer 85 having a slider 86 and resistor 87 which is connected across a secondary winding 88 of the transformer. Slider 86 is manually positioned along resistor 87 through an operable knob 89 integral therewith. A conductor 90 connects a center tap of secondary winding 80 and slider 86. Signal generator 64 comprises an altitude control potentiometer 92 having a slider 93 and resistor 94 which is connected across a secondary winding 95 of the transformer. An altitude controller 97 through a suitable operating connection 96 positions slider 93 relative to resistor 94 in accordance with changes in altitude of the craft from a preselected altitude. A conductor 98 connects a center tap of secondary winding 88 and slider 93. A conductor 99 extends from a center tap of secondary winding 95 to ground and the input circuit is completed through ground to amplifier conductor 57.

The accelerometer 100 comprises a vertically positioned support member 101 having laterally extending spring arms 102, 103 which at their free ends support weights 104, 105 of magnetic material. On the opposite side of the spring arms 102 and 103 from that to which the weights 104 and 105 are secured are carried switch contacts 106, 108 which respectively coact with switch contacts 107, 109 fastened to the support member 101. The accelerometer 100 is mounted approximately at the center of gravity of the aircraft so that it will not be responsive to angular accelerations of the craft. When the craft has a vertical acceleration normal to the pitch and roll axes of the craft the inertia of weight 105 has a tendency to cause a separation of contacts 108 and 109. Similarly when the aircraft has a downward vertical acceleration the inertia of weight 104 tends to separate contacts 106 and 107. The magnitude of the acceleration attained in a downward direction before switch contacts 106 and 107 will be separated may be selectively varied by a spring 110 having one end connected to spring arm 102 and its other end connected to a manually adjustable screw 111 passing through a flange on member 101 for varying the tension of spring 110. Similarly for varying the magnitude of the vertical upward acceleration that would cause the separation of switch contacts 108 and 109 is a spring 112 extending from spring arm 103 and connected to a manually adjustable screw 113 passing through a flange on member 101 for varying the tension in spring 112. Associated with the weight 104 is a control winding or coil 115 which when energized exerts a force on weight 104 tending to separate contacts 106 and 107. Similarly associated with weight 105 is a coil 116 which when energized exerts a force on weight 105 tending to separate contacts 108 and 109. The coils 115 and 116 are so designed that it will take a little time for the energization of the coils to build up to their maximum strength. The coils 115 and 116 are series with the field windings of the servomotor 17 such that during the intermittent operation of the amplifier relays 58 or 59 the energization of the coils 115 and 116 does not build up to their maximum value and have no effect on weights 104, 105. However when the amplifier relays 58 or 59 are continuously operated, the coils 115 and 116 will build up to their maximum attractive force and will exert a force on coils 115, 116. Such coils are referred to as "slugged coils" in the art and are therefore not new herein.

Having described the operative components of the arrangement their interrelationship will become more apparent from a description of the operation of the arrangement. The aircraft in which the arrangement is installed may have its elevator control surface directly manually positioned from the controller 11 to attain a desired attitude in pitch while in flight. With the craft in the desired selected attitude, the trim knob 89 may be manually adjusted to balance the network 60 so that no control voltage is applied to the amplifier 52 for this attitude.

Automatic elevator operation for stabilizing the craft in the selected attitude may be initiated by manually closing the normally open momentarily closed push button switch 120 the operation of which completes a circuit from battery 47, conductor 46, switch 120, conductor 121, engage relay winding 35, conductor 122, to ground and return to battery ground 123. The energization of winding 35 causes operation of the relay arms 36, 37, 38 and 39. A relay operation maintaining or holding circuit is now completed from energized conductor 46, conductor 45, relay arm 36, in contact 40, conductor 124, a normally closed-momentarily opened manually operable disconnect switch 125, conductor 126, switch contact 109, switch contact 108, spring arm 103, conductor 127, spring arm 102, switch contacts 106, 107, conductor 128, relay winding 35, conductor 122, to ground and return to battery ground 123. The engagement of relay arm 38 within contact 42 completes a circuit from battery 47, conductor 50, conductor 49, relay arm 38, in contact 42, conductor 31, magnetic clutch 22, conductor 32, to ground and return to battery ground conductor 123. Upon energization, the magnetic clutch 22 operatively connects the armature 20 with the cable drum 13 and thus to the elevator control surface.

With the servomotor 17 engaged with its control surface, the aircraft is maintained in the selected attitude by means of vertical gyroscope 82. Should the craft change pitch attitude due to a wind gust or smaller external disturbance, the vertical gyroscope 82 adjusts slider 78 relative to resistor 79 to unbalance the network 60. This unbalance of network 60 applies a control signal to amplifier 52 to in turn cause operation of one or the other of the amplifier relays 58, 59. If relay 58 should be operated due to this unbalance of network 60, a circuit is completed from battery 47, conductor 50, relay 58, conductor 48, relay arm 37, in contact 41, conductor 29, accelerometer coil 116, conductor 27, servomotor winding 18, conductor 23, servomotor armature 20, conductor 24, pulsing clutch-brake 21, conductor 25, to ground and return to battery ground 123. The energization of the pulsing clutch 21 causes it to move from its braked position to clutch position and energization of the field winding 18 and armature 20 causing the rotation of armature 20 to be transmitted to shaft 16 in a manner similar to that in Lear 2,267,114. The operation of shaft 16 is applied to cable drum 13 to position the elevator and also through the operating means 75 adjusts slider 68 of the rebalance potentiometer 67 until the network 60 is again in balanced position. As the signal voltage from network 60 decreases the relay 58 due to the design of amplifier 52 will be intermittently closed rather than being continuously closed as when the control signals in network 60 were large. The winding 18 of servomotor 17 is thus intermittently energized as are other elements in the circuit. During the time when clutch 21 is not energized, it moves to its brake position so that the cable drum 13 is held as positioned by the servomotor. The accelerometer coil 116 also being in this circuit is only intermittently energized and due to its design does not exert any appreciable force on weight 105. The operation of servomotor 17 has positioned the elevator control surface to restore the craft to its original attitude.

The operation of the accelerometer 100 will be considered when the craft is subject to a vertical acceleration due either to an up or a down draft while in flight. If the craft in its selected attitude, enters an up draft, the weight 105 tends to disengage contacts 108 and 109. The tension in spring 112 will have been so adjusted by the screw 113 that weight 105 will separate contacts 108 and 109 without energization of coil 116 at a magnitude of upward accelerations which is lower than that which the structure of the aircraft can withstand. Thus before the aircraft will have been overstressed, the acceleration in an upward direction causes the separation of contacts 108 and 109. This separation of contacts 108 and 109 interrupts the holding circuit for maintaining winding 35 of engage relay 18 energized so that the relay arms drop to the out position. With the magnetic clutch 22 deenergized, the pilot may directly manually operate the controller 11 to put in down elevator immediately to decrease the upward acceleration.

Similarly, if the vertical accelerations were in a downward direction the weight 104, due to its inertia, will separate contacts 106 and 107 when the predetermined magnitude of the downward acceleration has attained a value which is less than the acceleration in a downward direction which would overstress the aircraft. The above operation of the accelerometer 100 has been based on the circumstance that the automatic pilot was not involved in any controlling operation during this up or down draft.

The operation of the accelerometer will now be considered when the up or down draft is applied and with the automatic pilot also operating to exert a controlling effect. Should the craft in flight encounter an up draft that not only upwardly accelerates the craft but also causes it to tilt downwardly about its pitch axis, the vertical gyroscope 82 operates in response to the change in tilt to move slider 78. The movement of slider 78 unbalances network 60 and causes amplifier 52 to close relay 58 thereby energizing accelerometer coil 116 and servomotor winding 18. The elevator control surface is driven in an upward direction by operation of servomotor 18. It will be evident that the upward positioning of the elevator control surface adds an acceleration in an upwardly direction to that applied to the craft due to the up draft alone. This is by reason of the fact that the up elevator tilts the craft in an upwardly direction about its pitch axis and thereby increases the angle of attack. This increase in the angle of attack increases the lift of the craft and therefore increases its upward acceleration.

The energization of winding 18 has also energized accelerometer coil 116 which exerts a downward pull on weight 105. This pull on magnetic weight 105 decreases the magnitude of the acceleration which the aircraft may attain before switch contacts 108 and 109 are separated. The separation of contacts 108 and 109 operatively disengages the servomotor 17 and the elevator control surface. Although the aircraft has a momentum about its pitch axis due to the displaced elevator surface at the time that the disengagement occurs, this angular momentum while it increases the angle of attack additionally and thus may cause an increase in the linear acceleration does not overstress the craft because this increase in acceleration above the value of the lowered acceleration at which contacts 108 and 109 were separated does not reach a total acceleration of sufficient magnitude in an upward direction that would overstress the craft structure.

Similarly if a down draft were applied to the craft and resulted also in upward tilt of the craft about its pitch axis the resultant movement of slider 78 in network 60 causes operation of amplifier relay 59. The energization of relay 59 completes the circuit to energize servomotor winding 19 to position the elevator control surface in a downward direction tending to increase the downward acceleration above that provided by the down draft alone. However, the accelerometer coil 115 is energized along with the servomotor winding 19 and reduces the threshold of acceleration at which switch contacts 106 and 107 are separated to operatively disengage the servomotor from the elevator control surface.

While the operation of the accelerometer coils 115 and 116 was considered relative to normal automatic pilot operation while the craft was subject to a vertical acceleration from an external disturbance, the operation may also be considered where malfunction of the automatic pilot requires a decrease in the threshold of the acceleration despite the absence of an up or down draft on the craft.

Assume that there has been a downward tilt of the craft about its pitch axis due to an external gust or large shift in the position of the center of gravity of the aircraft. The vertical gyroscope 82 would position slider 78 to unbalance network 60 to cause the amplifier 52 to close relay 58. With the closing of amplifier relay 58 the winding 18 of the servomotor is energized. It is assumed that the unbalance of network 60 is so large that the input signal tends to maintain relay 58 closed continuously so that coil 116 is continuously energized over a sufficient period to make it effective.

If there were no rebalance of the network 60 due to a malfunction of one sort or another, the elevator surface would be continuously operated in an upward direction. This continuous upward movement of the elevator surface continues to increase the angle of attack. The continuous increase in angle of attack increases the lift of the craft and therefore increases the vertical acceleration of the craft.

By energizing coil 116 along with servomotor winding 18, the threshold of acceleration to which weight 105 responds in such manner as to separate contacts 108 and 109 is reduced. Therefore the angular momentum of the aircraft about its pitch axis due to the displaced elevator surface after servomotor disengagement will not increase the acceleration of the craft above the magnitude at which the separation of contacts 108 and 109 occurred to such an extent that the acceleration ultimately attained is of such magnitude as to overstress the aircraft.

In a similar manner if due to a malfunction, the elevator surface is positioned in a downward direction the winding 115 is energized along with the servomotor winding 19 to reduce the threshold of acceleration for separating contacts 106 and 107 to prevent a downward acceleration being attained that would cause overstress of the craft structure.

It will now be evident that I have provided a safety device for monitoring the accelerations of an aircraft provided with an automatic pilot or steering mechanism which functions to disengage the automatic pilot from a steering surface of the craft on the attainment by the craft of vertical accelerations of predetermined magnitude in either of two directions and which further functions when the automatic pilot is not operating properly to reduce automatically the magnitude of the acceleration at which the disengagement occurs.

I claim as my invention:

1. In a steering mechanism for a dirigible craft having a control surface for changing craft attitude about an axis, a servomotor, control means for operatively engaging said servomotor and control surface, an accelerometer responsive to vertical acceleration of said craft, means operated by said accelerometer in response to a predetermined magnitude of acceleration for causing said control means to disengage said servomotor and control surface, means for energizing said servomotor, and means in said accelerometer operated during energization of said servomotor for decreasing the magnitude of acceleration at which disengagement of said servomotor and control surface occurs.

2. In a steering mechanism for a dirigible craft having a control surface for changing craft attitude about an axis, a servomotor, control means for operatively engaging said servomotor and control surface, an accelerometer responsive to vertical acceleration of said aircraft in both directions, means operated by said accelerometer in response to a predetermined magnitude of acceleration of said craft in either direction for causing said control means to disengage said servomotor and control surface, means for energizing said servomotor, and means in said accelerometer operated during energization of said servomotor for decreasing the magnitude of acceleration in one direction of said craft at which disengagement of said servomotor and surface occurs.

3. In a dirigible craft having a control surface which may be manually or power operated for changing craft attitude about an axis, a servomotor, control means for operatively engaging said servomotor and control surface, an accelerometer responsive to vertical acceleration, means operated by said accelerometer in response to a predetermined magnitude of acceleration of said craft for causing said control means to disengage said servomotor and control surface, means including a balanceable network for energizing said servomotor to maintain a predetermined attitude of said craft about said axis, and means in said accelerometer operated during energization of said servomotor for decreasing the magnitude of acceleration at which disengagement of said servomotor and surface occurs.

4. In a steering mechanism for a dirigible craft having a control surface for changing craft attitude about an axis, a servomotor, control means for operatively engaging said servomotor and control surface, an accelerometer responsive to vertical acceleration of said craft, means operated by said accelerometer in response to a predetermined magnitude of acceleration causing said control means to disengage said servomotor and control surface, adjusting means to vary the response of said accelerometer to change the value of acceleration at which said disengagement occurs, means for energizing said servomotor, and means in said accelerometer operated during energization of said servomotor for automatically decreasing the magnitude of acceleration at which disengagement of said servomotor and control surface occurs.

5. In a steering mechanism for a dirigible craft having a control surface for changing craft attitude about an axis and including a servomotor and control means for operatively engaging said servomotor and control surface, an accelerometer responsive to linear acceleration of said craft said accelerometer including a magnetic weight and coacting contacts said weight upon the attainment of a predetermined linear acceleration causing separation of said contacts for causing said control means to disengage said servomotor and control surface, a coil for providing a magnetic field exerting an effect on said weight tending to separate said contacts, and means for energizing said coil during the positioning of said surface by said servomotor.

6. In a flight control apparatus for a dirigible craft, an accelerometer having a movable element responsive to vertical accelerations, means connected to said movable element for adjusting the acceleration at which said element moves, a servomotor, means controlled by said accelerometer and effective upon movement thereof for operatively disengaging said servomotor with a control surface of said craft, means for energizing said servomotor, and means acting on said movable element in a direction opposite to that of said adjusting means during the energization of said servomotor for lowering the magnitude of acceleration at which disengagement of said servomotor and said surface occurs.

7. In a steering mechanism for a dirigible craft having a control surface for changing craft attitude about an axis, a servomotor, control means for operatively engaging said servomotor and control surface, a device responsive to a change in a condition of said craft, means operated by said device in response to a predetermined magnitude of change in said condition for causing said control means to disengage said servomotor and control surface, means for energizing said servomotor, and means in said device operated during energization of said servomotor for decreasing the magnitude of change of said condition at which disengagement of said servomotor and said surface occurs.

8. In a flight control apparatus for a dirigible craft having a control surface, means for positioning said control surface, an accelerometer having two relatively movable elements which on relative movement effects disengagement of said operating means from said control surface, and means operated during continuous displacement of said control surface in one direction for lowering the magnitude of acceleration at which said relative movement occurs.

9. In an aircraft having a control surface for moving the craft about an axis, an automatic pilot having a servomotor adapted to be operatively connected to said control surface, means responsive to a predetermined magnitude of vertical acceleration of said craft due to an exterior disturbance for severing operation of said control surface by said servomotor, and means associated with said responsive means during positioning of said surface in a direction tending to increase said acceleration for decreasing the magnitude of the acceleration at which the severing of said servomotor and control surface occurs.

10. In control apparatus for an aircraft having a control surface for controlling the attitude of the craft, a first accelerometer means responsive to vertical craft axis accelerations in one direction, a second accelerometer means responsive to vertical craft axis accelerations in an opposite direction, a servomotor for controlling the positioning of said surface, means for severing control of said surface from said servomotor and operated by said accelerometers upon a predetermined acceleration along said axes in either direction, and means for varying the response of an accelerometer in accordance with a continuously changing surface position, to reduce the magnitude of the acceleration at which said control is severed.

11. In an aircraft having control surface for moving the craft about an axis, an automatic pilot having a servomotor adapted to be operatively connected to said control surface, means responsive to a predetermined magnitude of a condition of said craft for severing operation of said control surface by said servomotor, and means associated with said responsive means during positioning of said surface in a direction tending to increase said condition for decreasing the magnitude of the condition at which the severing of said servomotor and control surface occurs.

12. In a dirigible craft having a control surface which may be manually or power operated for changing craft attitude about an axis, in combination: a servomotor; control means for operatively engaging said servomotor and control surface; an amplifier having alternatively operable relays for reversibly controlling said servomotor; a balanceable network connected to the amplifier for operating one or the other of said amplifier relays depending on the direction of unbalance of said network; an accelerometer responsive to vertical acceleration of the craft; means operated by said accelerometer for causing said control means to disengage said servomotor and control surface; and circuit means connected with said accelerometer and operated during energization of said servomotor during closing of an amplifier relay for increasing the effectiveness of said accelerometer.

ROBERT J. KUTZLER.

References Cited in the file of this patent
UNITED STATES PATENTS

| Number | Name | Date |
| --- | --- | --- |
| 2,461,533 | Dose | Feb. 15, 1949 |
| 2,487,793 | Esval et al. | Nov. 15, 1949 |
| 2,553,560 | Esval | May 22, 1951 |
| 2,604,613 | Klass | July 22, 1952 |
| 2,627,384 | Esval | Feb. 3, 1953 |